Nov. 14, 1944. R. LAPPERT 2,362,566

BEARING

Filed Dec. 1, 1942

Inventor
Ronald Lappert
By Willis F. Avery
Atty.

Patented Nov. 14, 1944

2,362,566

UNITED STATES PATENT OFFICE 2,362,566

BEARING

Ronald Lappert, Akron, Ohio, assignor to The B. F. Goodrich Company, New York, N. Y., a corporation of New York Application December 1, 1942, Serial No. 467,505

4 Claims. (Cl. 308—71)

This invention relates to bearings and is especially useful in bearings where adjustment for wear is desired.

Bearings for shafts and spindles and the shafts and spindles themselves wear in time so that excessive vibration of the shaft is possible and considerable lubrication is necessary. This is particularly true of water lubricated bearings having a bearing face of rubber or other rubber-like material.

The principal objects of the present invention are to provide adjustment for wear, to provide simplicity of construction, to reduce vibration, and to provide these features in a water-lubricated bearing having a bearing face of rubber or other rubber-like material.

These and other objects will appear from the following description and the accompanying drawing.

Figure 1:
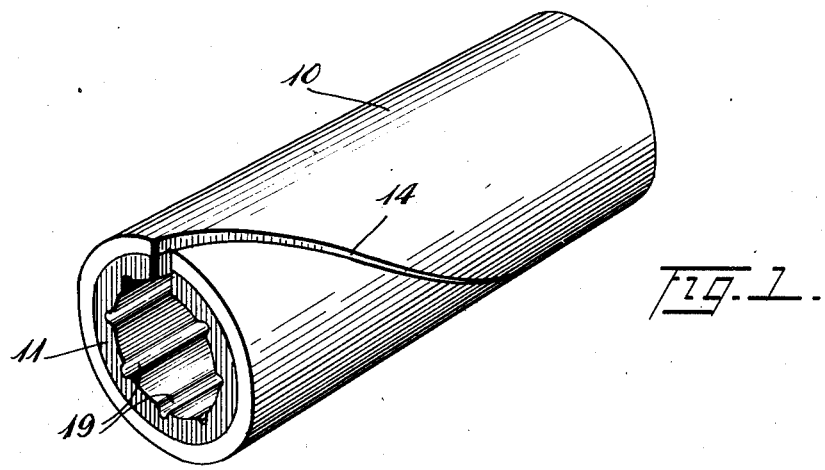
Fig. 1 is a perspective view of a bearing constructed in accordance with and embodying the invention as applied to a rubber-faced bearing.
Figure 2:
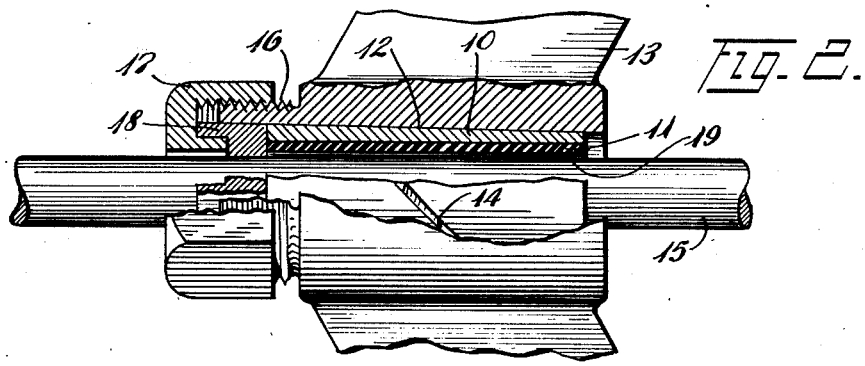
Fig. 2 is a side elevation partly broken away and in section showing the bearing of Fig. 1 in use.

In the illustrative embodiment of the invention, a conically tapered bushing is provided with an internal bearing surface of rubber-like material and is split helically from end to end so that when mounted in a correspondingly tapered bore, it may be adjusted longitudinally to change its internal diameter without objectionably affecting the shape of the bearing surface. In this action the bearing face of resilient rubber-like material has the advantage of accommodating changes in the bearing shape resulting from changes in the diameter of the bushing.

Referring to the drawing, a bushing 10 of stiff material, such as metal, is provided on its inner surface with a layer 11 of resilient rubber or other rubber-like material having a bearing surface of such resilient material which may be grooved as at 19 for passage of a liquid lubricant. The outer surface of the bushing is conical so as to fit a tapered bore 12 of a supporting bracket 13. The bushing 10 and preferably also the layer 11 are split lengthwise from end to end, and preferably along a helical path, as at 14, so as not to catch on any key way or other groove of the shaft 15 and to distribute the split area about the shaft. In some cases the bushing 10 only need be split, the layer 11 of resilient material being left continuous.

Any convenient means may be provided for adjusting the bushing axially with respect to the tapered bore in which it is seated to close in the bearing about the shaft. As shown, a threaded tubular projection 16 is formed on the bracket 13 about the bore 12 and a threaded cap 17 is fitted thereover. A thrust collar 18 extends between the cap and the bushing 10. The arrangement is such that by turning the cap 17 with respect to the bracket in a direction to move it toward the bushing the conical bushing is forced along the tapered bore causing the bushing to close in about the shaft.

Figure 3:
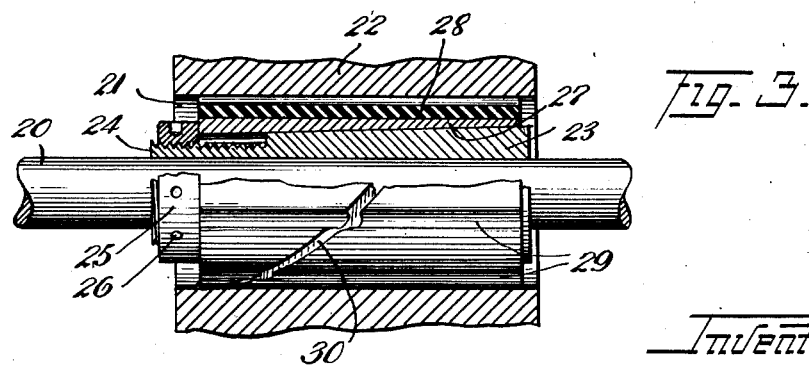
Fig. 3 is a view, partly broken away and partly in section of another form of the invention.

In the embodiment of the invention shown in Fig. 3, the numeral 20 designates a rotatable shaft extending through a bore 21 of a stationary member 22. A conical sleeve 23 is fixed to the shaft and has a threaded end 24. A threaded collar 25 having spanner holes 26 is mounted on the threaded end 24 for adjustment purposes. A bearing sleeve 27 of stiff material such as metal has a tapered bore adapted to be seated on the conical sleeve 23 and has a bearing surface covering 28 of resilient rubber-like material. The surface covering is grooved axially, as at 29, to provide lubricant grooves, and the bearing sleeve and its covering are split helically, as at 30, to permit spreading of the bearing by the tapered sleeve 23 when the bearing is adjusted therealong. The arrangement is such that by turning the collar 25 the bearing is expanded to adjust it.

Variations may be made without departing from the scope of the invention as it is defined by the following claims.

I claim:

1. A liquid-lubricated bearing in which resilient rubber-like material provides the bearing face, said bearing comprising a tapered tubular element circumferentially discontinuous to permit change in size when said element is forced axially along a tapered surface for adjusting it, and resilient rubber-like material on said element presenting a bearing face of the rubber-like material and accommodating change in size of said element by virtue of the resilient flexibility of the rubber-like material.

2. A liquid-lubricated bearing in which resilient rubber-like material provides the bearing face, said bearing comprising a tapered tubular element circumferentially discontinuous to permit change in size when said element is forced axially along a tapered surface for adjusting it, and resilient rubber-like material on the inner face of said element presenting a bearing face of the rubber-like material grooved for passage of the lubricant and accommodating change in size of said element by virtue of the resilient flexibility of the rubber-like material.

3. A liquid-lubricated bearing in which resilient rubber-like material provides the bearing face, said bearing comprising a tapered tubular element split axially to permit change in size when said element is forced axially along a tapered surface for adjusting it, and resilient rubber-like material on said element presenting a bearing face of the rubber-like material and accommodating change in size of said element by virtue of the resilient flexibility of the rubber-like material, said rubber-like material being split coincidental with the split of said element.

4. A liquid-lubricated bearing in which resilient rubber-like material provides the bearing face, said bearing comprising a tapered tubular element split helically to permit change in size when said element is forced axially along a tapered surface for adjusting it, and resilient rubber-like material on the inner face of said element presenting a bearing face of the rubber-like material and accommodating change in size of said element by virtue of the resilient flexibility of the rubber-like material, said rubber-like material being split helically coincidental with the split of said element.

RONALD LAPPERT.